A. L. STANFORD.
NUT CUTTING TOOL.
APPLICATION FILED JUNE 11, 1918.
1,300,039.
Patented Apr. 8, 1919.
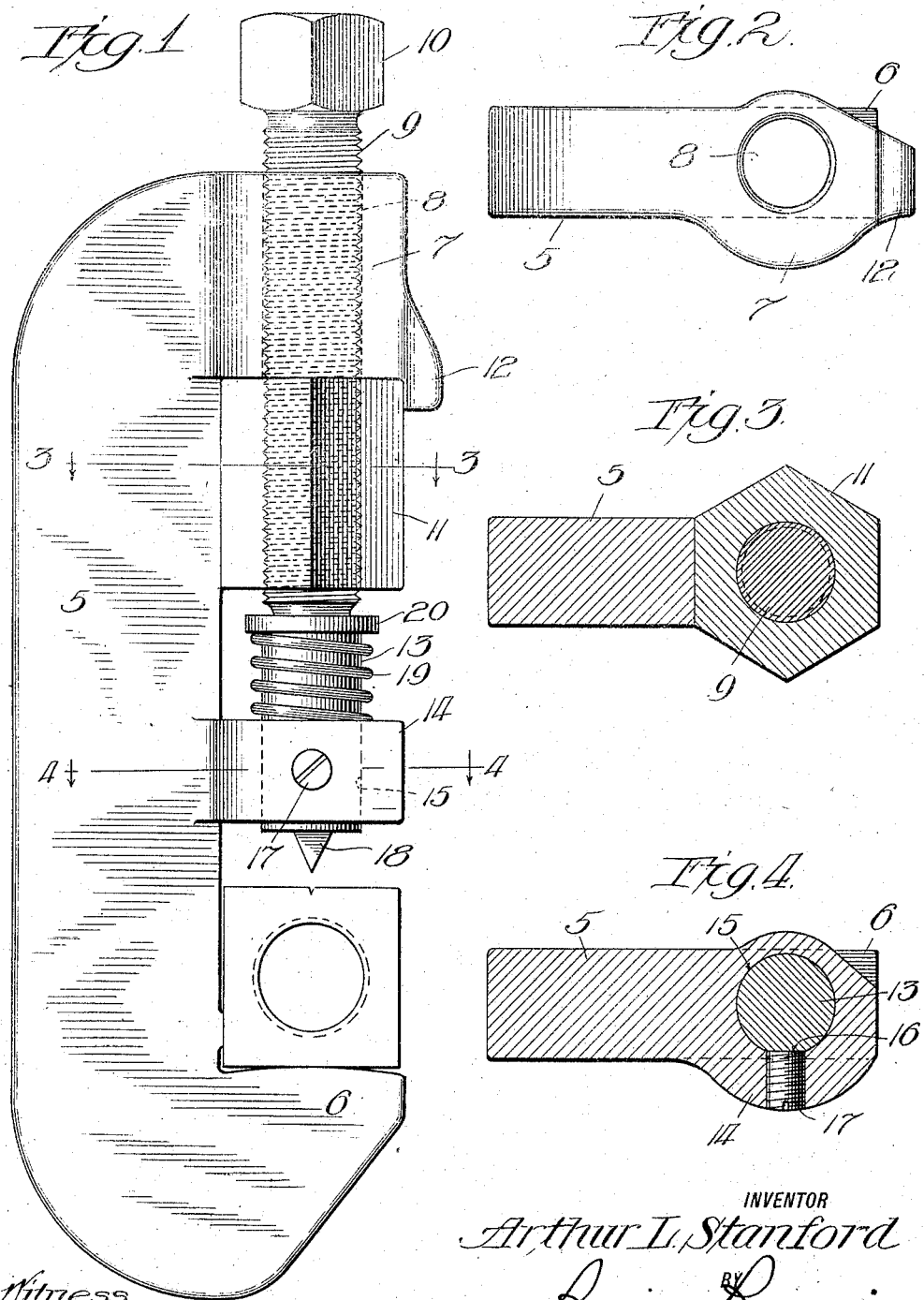

ically located with respect to# UNITED STATES PATENT OFFICE.

ARTHUR L. STANFORD, OF CHICAGO, ILLINOIS.

NUT-CUTTING TOOL.

1,300,039.

Specification of Letters Patent.

Patented Apr. 8, 1919.

Application filed June 11, 1918. Serial No. 239,363.

*To all whom it may concern:*

Be it known that I, ARTHUR L. STANFORD, a citizen of the United States, residing at Chicago, in the county of Cook and State of Illinois, have invented certain new and useful Improvements in Nut-Cutting Tools, of which the following is a specification.

The tool of the present invention is intended primarily for use in cutting nuts from rail bolts in cases where the nuts have become so rusted that their removal by means of a wrench is practically impossible. In circumstances of this kind it is customary to cut the nut by the use of a sledge and cold chisel or the like, but this is a difficult undertaking in view of the fact that the cold chisel tends to spring away from the cut after each stroke of the sledge, so that rapid progress is impossible.

The tool of the present invention is designed to afford a jaw for maintaining the cutter in contact with the nut as the work progresses, so that full effect will be realized from each stroke of the sledge or hammer, thereby enabling the nut to be quickly cut to a point where its removal can be easily effected.

The invention consists in the features of construction and combinations of parts hereinafter described and claimed.

In the drawings:

Figure 1 is a side elevation of the tool in position to begin the cutting operation;

Fig. 2 is a top or plan view of the same;

Fig. 3 is a cross sectional view taken on line 3—3 of Fig. 1; and

Fig. 4 is a cross sectional view taken on line 4—4 of Fig. 1.

The tool comprises an elongated body portion 5 terminating at its lower end with an angularly disposed jaw 6 adapted to bear against the under side of a nut and terminating at its upper end in a head 7, which head, as shown in Fig. 2, is preferably enlarged on one side only in order to reduce the extreme lateral dimensions of the tool with a view of enabling it to be used in cases where the nut lies in close proximity to a rail splice bar or other obstruction.

The head is provided with a smooth bore 8 which is centrally located with respect to the lower jaw and the body of the tool, but is decentered with respect to the head itself. The smooth bore 8 receives a bolt 9 provided with an enlarged driving head 10. The lower end of the bolt is threaded through a hexagonal guide nut 11, preferably of double thickness to resist a heavy thrust, which nut is of a size to bring one of its faces into snug contact with the inner edge of the body 5 so that the nut will be held against turning as the bolt is screwed down during the progress of the work. As an additional means for holding the nut in position, and to better centralize the thrust of the bolt, an overhanging lip 12 depends from the outer lower edge of the head 7 and embraces the outer flat side of the nut at its upper edge.

The lower end of the bolt abuts against the upper end of a cylindrical tool carrier 13 which is slidably mounted through a guide lug 14, which extends inwardly from the body 5 and is provided with a smooth bore 15 decentered for the purpose of reducing the cross dimensions of the tool. The tool carrier on one side is provided with a guide groove 16 which receives the inner end of a screw bolt 17 entered through one side of the guide lug 14, as shown in Fig. 4. A wedge-shaped cutting tool 18 is socketed within the lower end of the tool carrier in position to cut through the side of a nut for the purpose of permitting its removal.

In order to provide for the easy retraction of the cutting tool after the work has been completed, a coil spring 19 is provided which encircles the tool carrier, bearing at its lower end against the guide lug 14 and at its upper end against a flange 20 on the tool carrier.

The tool is used in the following manner: The driving bolt 9 is unscrewed to the degree necessary to enable the spring to lift the cutting tool to the position shown in Fig. 1, which enables the tool to be applied to the nut to be removed. Thereafter the driving bolt will be turned down to force the cutting tool into close contact with the work. It is desirable to apply considerable force in turning the driving bolt to place, and the nut 11 is formed of double dimensions in order to permit a heavy turning to be imparted by the bolt.

After the bolt has been turned to its limit, a sledge or hammer is used to strike the head of the bolt a sharp blow, which causes the cutting tool to initially bite into the work. Thereafter the driving bolt will be additionally turned to close up the cut and the work will progress by an alternate driving and turning of the driving bolt until the cutting has progressed sufficiently to stretch the metal of the rusted nut to a point where its removal by means of a wrench can be accomplished. It has been found that it is not ordinarily necessary to cut completely through the nut, since a partial cut will ordinarily open up the nut sufficiently to enable it to be turned off.

After the cutting has progressed to a given point, the tool as a whole can be turned after the manner of a wrench to start the nut or to ascertain whether additional cutting will be required to permit its removal. In removing the tool from the work, an unscrewing of the driving bolt will relieve the pressure on the tool carrier, allowing the spring to act and restore the tool carrier to normal position. The upper end of the driving bolt can be made smooth, if desired, to permit it to move freely through the smooth bore in the head, although it should, of course, be threaded sufficiently to provide for the necessary travel through the guide nut 11 which receives the thrust due to the advancement of the bolt.

The guide nut will be held against turning by reason of its contact with the edge of the body 5, and at the same time will advance freely with the bolt in a longitudinal direction when the bolt is driven down by blows from the sledge or hammer, returning to contact with the head 7, however, by the upward pressure of the spring 19 as soon as the hammering ceases.

By maintaining the cutting tool under hard screw pressure with the work when the impact of the sledge or hammer is received, the cutting action of the tool will be greatly increased and the driving force of the sledge or hammer used to the utmost advantage. At the same time the cutting tool will never become displaced during the time the work is progressing or until the cutting is completed.

I claim:

1. In a tool of the character described, the combination of a body provided with means to engage a nut, a threaded guide member mounted for longitudinal movement with respect to the body and held against turning movement, a driving bolt threaded through the guide member, and a cutting member positioned to receive the impact of the driving bolt, substantially as described 2. In a tool of the character described, the combination of a body provided with means to engage a nut, a threaded guide member mounted for longitudinal movement with respect to the body and held against turning movement, a driving bolt threaded through the guide member, a cutting member positioned to receive the impact of the driving bolt, and a guide member on the body for guiding the advance of the cutting member, substantially as described.

3. In a tool of the character described, the combination of a body provided with means to engage a nut, a threaded guide member mounted for longitudinal movement with respect to the body and held against turning movement, a driving bolt threaded through the guide member, a cutting member positioned to receive the impact of the driving bolt, a guide member on the body for guiding the advance of the cutting member, and a spring for retracting the cutting member, substantially as described.

4. In a tool of the character described, the combination of a body provided with an overhanging bored head at one end and a jaw at the other end, a driving bolt slidable through the head, a guide nut through which the driving bolt is threaded, said nut having end contact with the head and side contact with the body and being slidable with respect to the body and held against rotation with respect thereto, and a cutting tool adapted to receive the impact of the driving bolt, substantially as described.

5. In a tool of the character described, the combination of a body provided with an overhanging bored head at one end and a jaw at the other end, a driving bolt slidable through the head, a guide nut having end contact with the head and side contact with the body and being slidable with respect thereto, a cutting tool adapted to receive the impact of the driving bolt, and a guide lug on the body for guiding the cutting tool, substantially as described.

6. In a tool of the character described, the combination of a body provided at one end with an overhanging head and at its other end with a jaw, a driving bolt slidable through the head, a guide nut through which the bolt is threaded, said guide nut having end contact with the head and side contact with the body and being slidable with respect to the body and held against rotation with respect thereto, a guide lug outstanding from the body, a tool carrier slidably mounted through the guide lug, a cutting tool socketed within the tool carrier, a spring encircling the tool carrier and bearing at one end against the guide lug, and a flange on the tool carrier against which the opposite end of the spring bears for retracting the cutting tool, substantially as described.

7. In a tool of the character described, the combination of a body, a driving bolt slidably mounted with respect to the body, a threaded member slidable with respect to the body and held against rotation with respect thereto, through which threaded member the driving bolt is entered, an abutment on the body affording a bearing for the rear end of the threaded member, and a cutting tool positioned to receive the impact of the driving bolt, substantially as described.

ARTHUR L. STANFORD.